(12) United States Patent
Bonefas et al.

(10) Patent No.: US 8,825,869 B2
(45) Date of Patent: *Sep. 2, 2014

(54) METHOD AND SYSTEM FOR DEPLOYING CONTENT TO WIRELESS DEVICES

(71) Applicant: Telecommunication Systems, Inc., Annapolis, MD (US)

(72) Inventors: Rudy Bonefas, Bel Air, MD (US); Michael Miller, Germantown, MD (US); Dale Shelton, Annapolis, MD (US); L. Jay Wantz, Taneytown, MD (US)

(73) Assignee: Roussillon LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,097

(22) Filed: Jan. 28, 2013

(65) Prior Publication Data

US 2013/0227059 A1 Aug. 29, 2013

Related U.S. Application Data

(60) Division of application No. 13/345,187, filed on Jan. 6, 2012, now Pat. No. 8,364,821, which is a continuation of application No. 12/318,946, filed on Jan. 13, 2009, now Pat. No. 8,095,663, which is a continuation of application No. 09/709,487, filed on Nov. 13, 2000, now Pat. No. 7,483,983.

(51) Int. Cl.
*G06F 15/173* (2006.01)

(52) U.S. Cl.
USPC .......................... 709/226; 709/200; 709/246

(58) Field of Classification Search
USPC ......................... 709/200, 226, 246
See application file for complete search history.

(56) References Cited

U.S. PATENT DOCUMENTS

| | | | |
|---|---|---|---|
| 5,446,736 A | 8/1995 | Gleeson | |
| 5,673,322 A | 9/1997 | Pepe | |
| 5,825,752 A | 10/1998 | Fujimori | |
| 5,860,073 A * | 1/1999 | Ferrel et al. | 715/255 |
| 5,899,975 A | 5/1999 | Nielsen | |
| 5,970,059 A | 10/1999 | Ahopelto | |
| 6,026,430 A | 2/2000 | Butman | |
| 6,041,357 A | 3/2000 | Kunzelman | |

(Continued)

OTHER PUBLICATIONS

Transmission Control Protocol, DARPA Internet Program Protocol Specification, RFC 793, Sep. 1981, pp. 1-85.

(Continued)

*Primary Examiner* — Anthony Mejia
(74) *Attorney, Agent, or Firm* — Amin, Turocy & Watson, LLP

(57) ABSTRACT

A method and system for deploying content to devices is provided. The method and system can be used to deploy markup content to web browser applications on wireless devices. The wireless devices may included, for example, WAP phones, HDML phones, Palm VII, Palm V, etc. The method and system can also be used in conjunction with wired systems. A translator receives data, in a variety of formats, from the wireless devices. The translator then translates the data into a standardized format. A content provider interface receives the data in the standardized format and provides content data, also in the standardized format. The content data in the standardized format is provided to a transformer. The transformer transforms the content data into the pre-selected format for the particular wireless device. The content data can then be utilized and manipulated by the wireless device.

10 Claims, 12 Drawing Sheets

(56) References Cited

U.S. PATENT DOCUMENTS

| | | | | |
|---|---|---|---|---|
| 6,085,247 | A | 7/2000 | Parsons | |
| 6,101,545 | A | 8/2000 | Balcerowski | |
| 6,101,549 | A | 8/2000 | Baugher | |
| 6,169,515 | B1 | 1/2001 | Mannings | |
| 6,230,173 | B1 * | 5/2001 | Ferrel et al. | 715/205 |
| 6,269,336 | B1 | 7/2001 | Ladd | |
| 6,304,564 | B1 | 10/2001 | Monin | |
| 6,338,082 | B1 | 1/2002 | Schneider | |
| 6,418,128 | B1 | 7/2002 | Takagi | |
| 6,430,624 | B1 * | 8/2002 | Jamtgaard et al. | 709/246 |
| 6,519,643 | B1 | 2/2003 | Foulkes | |
| 6,529,722 | B1 | 3/2003 | Heinrich | |
| 6,578,056 | B1 | 6/2003 | Lamburt | |
| 6,600,735 | B1 | 7/2003 | Iwama | |
| 6,601,101 | B1 | 7/2003 | Lee | |
| 6,601,108 | B1 * | 7/2003 | Marmor | 709/246 |
| 6,628,965 | B1 | 9/2003 | LaRossa | |
| 6,647,264 | B1 | 11/2003 | Sasamoto | |
| 6,718,384 | B2 | 4/2004 | Linzy | |
| 6,721,779 | B1 | 4/2004 | Maffeis | |
| 6,721,872 | B1 | 4/2004 | Dunlop | |
| 6,735,631 | B1 | 5/2004 | Oehrke | |
| 6,771,742 | B2 | 8/2004 | McCalmont | |
| 6,778,099 | B1 | 8/2004 | Meyer | |
| 6,785,261 | B1 | 8/2004 | Schuster | |
| 6,788,949 | B1 | 9/2004 | Bansal | |
| 6,792,577 | B1 * | 9/2004 | Kimoto | 715/235 |
| 6,874,018 | B2 | 3/2005 | Wu | |
| 6,894,984 | B2 | 5/2005 | Wastlhuber | |
| 6,894,988 | B1 | 5/2005 | Zehavi | |
| 6,925,307 | B1 * | 8/2005 | Mamdani et al. | 455/466 |
| 6,937,869 | B1 | 8/2005 | Rhyburn | |
| 6,954,751 | B2 * | 10/2005 | Christfort et al. | 707/736 |
| 6,973,505 | B1 | 12/2005 | Schneider | |
| 6,983,370 | B2 | 1/2006 | Eaton | |
| 7,016,360 | B1 | 3/2006 | Dong | |
| 7,043,255 | B1 | 5/2006 | Tiwari | |
| 7,099,946 | B2 | 8/2006 | Lennon | |
| 7,191,245 | B2 | 3/2007 | Takayama | |
| 7,324,556 | B2 | 1/2008 | Hoff | |
| 7,426,535 | B2 | 9/2008 | Gershman | |
| 7,711,094 | B1 | 5/2010 | Olshansky | |
| 7,818,664 | B2 * | 10/2010 | Gordon et al. | 715/234 |
| 2001/0005809 | A1 | 6/2001 | Ito | |
| 2001/0056354 | A1 * | 12/2001 | Feit et al. | 705/1 |
| 2002/0002599 | A1 | 1/2002 | Arner | |
| 2002/0002602 | A1 | 1/2002 | Vange | |
| 2002/0049790 | A1 * | 4/2002 | Ricker et al. | 707/513 |
| 2002/0059344 | A1 * | 5/2002 | Britton et al. | 707/513 |
| 2002/0169539 | A1 | 11/2002 | Menard | |
| 2003/0158897 | A1 * | 8/2003 | Ben-Natan et al. | 709/204 |
| 2005/0213716 | A1 | 9/2005 | Zhu | |
| 2005/0272443 | A1 | 12/2005 | Hose | |
| 2006/0072547 | A1 | 4/2006 | Florkey | |
| 2007/0266176 | A1 * | 11/2007 | Wu | 709/242 |
| 2008/0063153 | A1 | 3/2008 | Krivorot | |
| 2008/0101552 | A1 | 5/2008 | Khan | |
| 2008/0178072 | A1 * | 7/2008 | Fiedorowicz et al. | 715/235 |
| 2008/0200143 | A1 | 8/2008 | Qiu | |
| 2009/0003312 | A1 | 1/2009 | Velazquez | |
| 2009/0103687 | A1 | 4/2009 | Peters | |
| 2010/0268773 | A1 * | 10/2010 | Hunt et al. | 709/203 |

OTHER PUBLICATIONS

Joe, Inwhee; A new AAL Protocol for Time-Critical UDP Traffic over Wireless ATM Networks IEEE 1999, pp. 1095-1099.

\* cited by examiner

METHOD AND SYSTEM FOR DEPLOYING CONTENT TO WIRELESS DEVICES

This application is a divisional of U.S. application Ser. No. 13/345,187, filed on Jan. 6, 2012, entitled "METHOD AND SYSTEM FOR DEPLOYING CONTENT TO WIRELESS DEVICES, " now U.S. Pat. No. 8,364,821; which is a continuation of U.S. application Ser. No. 12/318,946, filed on Jan. 13, 2009, entitled "METHOD AND SYSTEM FOR DEPLOYING CONTENT TO WIRELESS DEVICES," now U.S Pat. No. 8,095,663; which in turn is a continuation of U.S. application Ser. No. 09/709,487, filed Nov. 13, 2000, entitled "METHOD AND SYSTEM FOR DEPLOYING CONTENT TO WIRELESS DEVICES," now U.S. Pat. No. 7,483,983 the entirety of all of which are expressly incorporated herein by reference.

FIELD OF INVENTION

The present invention relates in general to the field of communications and in particular to a method and system for deploying content to devices.

BACKGROUND OF THE INVENTION

A multitude of wireless handsets, personal data assistants (PDAs), and pagers exist that feature microbrowsers for wireless access to the World Wide Web (Web). Wireless Web development standards are emerging from groups such as the Wireless Access Protocol (WAP) Forum™. However, these standards have yet to fully permeate the market. Therefore, handset and PDA manufacturers currently support several different protocols and markup languages. The plethora of protocols and languages create a problem for application developers trying to provide content that can be presented, with some consistency, across the widest range of devices. This is often referred to as the "Write Once, Render Anywhere" problem The WAP Forum is addressing this problem by standardizing on a markup language, Wireless Markup Language (WML), and providing a set of guidelines for developers. Although a tremendous help, WML does not cover the vast array of devices already on the market, not to mention those devices deployed with non-conformant software and services.

Most wireless Web enabled devices attach to a gateway or proxy system housed at a network carrier or Wireless Service Provider (WSP). FIG. 1 shows various methods of wireless Internet access. Most Web enabled phones 2 use the phone.com 3.x UP.Browser to request content from an origin Web server. Phone.com UP.Link gateways 3, housed at the carrier sites, process these requests, which are fulfilled over the Internet 4 via services 5. Newer phones and some pagers already support the WAP standards and they connect through a WAP gateway 6. Web-enabled Palm PDAs 7 pass through a proxy service 9, 10, which is supplied by Palm.net or Omni-Sky services, for example. All of these methods are similar, in that the wireless request passes through a gateway or proxy service, for example, UP.Link gateway 3, WAP gateway 6, and proxies 9, 10, to be translated into a wire-based HTTP/S request. Although the request model for the most common wireless Internet connections are similar, their underlying networks and device technologies differ. Wireless handset and PDA operating systems are usually delivered with a communication stack that abstracts the application developer from the underlying communication protocols and network technologies. Microbrowsers supplied on the wireless handsets and PDAs render hyperlinked markup content on the user interface display and enable user-directed navigation.

Currently, custom Web applications have to be developed for each specific device that uses different languages and protocols. Accordingly, there is a need for a uniform approach to content delivery to deliver an application to the broadest audience, across the widest possible set of devices.

SUMMARY OF THE INVENTION

A method and system for deploying content to devices is provided. The method and system can be used to deploy markup content to web browser applications on wireless devices. The wireless device may included, for example, WAP phones, HDML phones, Palm VII, Palm V, etc. The method and system can also be used in conjunction with wired systems. A translator receives data, in a variety of formats, from the wireless devices. The translator then translates the data into a standardized format. A content provider interface receives the data in the standardized format and provides content data, also in the standardized format. The content data in the standardized format is provided to a transformer. The transformer transforms the content data into a format for the particular wireless device and/or application. The content data can then be utilized and manipulated by the wireless device.

In another embodiment, data can be spontaneously sent to a device from a content provider. The data and an identifier (ID) to may be provided to the transformer. The ID can be looked up in a database to associate it with a device. A content type specific form is determined for the device. Based on the content type specific form, a transformation may be selected. The data can then be transformed using the selected transformation and the transformed data forwarded to the device. In a further embodiment, multiple transformations can be applied to the data. The transformations may be applied sequentially, independently, or a combination of both. The independent transformations may be done simultaneously.

According to another embodiment, a method for deploying markup content to browser applications on devices is provided. Messages and requests are accepted from the devices. The messages and requests may be processed as synchronous messages via a block and wait mechanism. Information related to form data, session data, MIME data, and a message key can be retrieved in order to generate an XML stream. The XML stream may then be parsed into an XML message. Next, it can be determined which of a number of content provider interfaces can handle the XML message based on the message key. A content provider interface should be selected to process the XML message and the XML message can be forwarded to the selected content provider interface. A response is then received from the selected content provider interface. One or more XSL stylesheets may be selected and used to transform the response into device type specific and content type specific form. Next, the transformed response can be forwarded to the requesting devices.

In a further embodiment, a method for deploying markup content to browser applications on devices is provided. Requests are accepted from devices. The requests are preferably processed as synchronous messages via a block and wait mechanism. Information related to at least one of form data, session data, MIME data, and a message key is retrieved in order to generate an XML stream. The XML stream is parsed into an XML message. Content provider interfaces that can handle the XML message are determined based on the message key and a content provider interface is selected to process XML message. The XML message is provided to the selected content provider interface. A response is received from the selected content provider interface. One or more XSL style sheets may be selected to transform the response into one or more forms. The transformed response may then be sent to the requesting devices.

Additionally, the system and method allow for content providers to be added dynamically. According to one possible method, an XSL style sheet should be previously registered in a provider database for any new content providers to be added. When a content provider is added dynamically, the provider database is queried. The previously registered XSL style sheet associated with the new content provider is received from the provider database. This style sheet may then be used to transform data provided by the new content provider.

DETAILED DESCRIPTION OF THE INVENTION

A method and system for deploying content to devices is provided. The method and system can be used to deploy markup content to web browser applications on wireless devices. The wireless device may included, for example, WAP phones, HDML phones, Palm VII, Palm V, etc. A translator may receive data, in a variety of formats, from the wireless devices. The translator then translates the data into a standardized format. A content provider interface receives the data in the standardized format and provides content data, preferably also in the standardized format. The content data in the standardized format is then provided to a transformer. The transformer transforms the content data into a format for the particular wireless device and/or application. The content data can then be utilized and manipulated by the wireless device and/or application.

Figure 1:
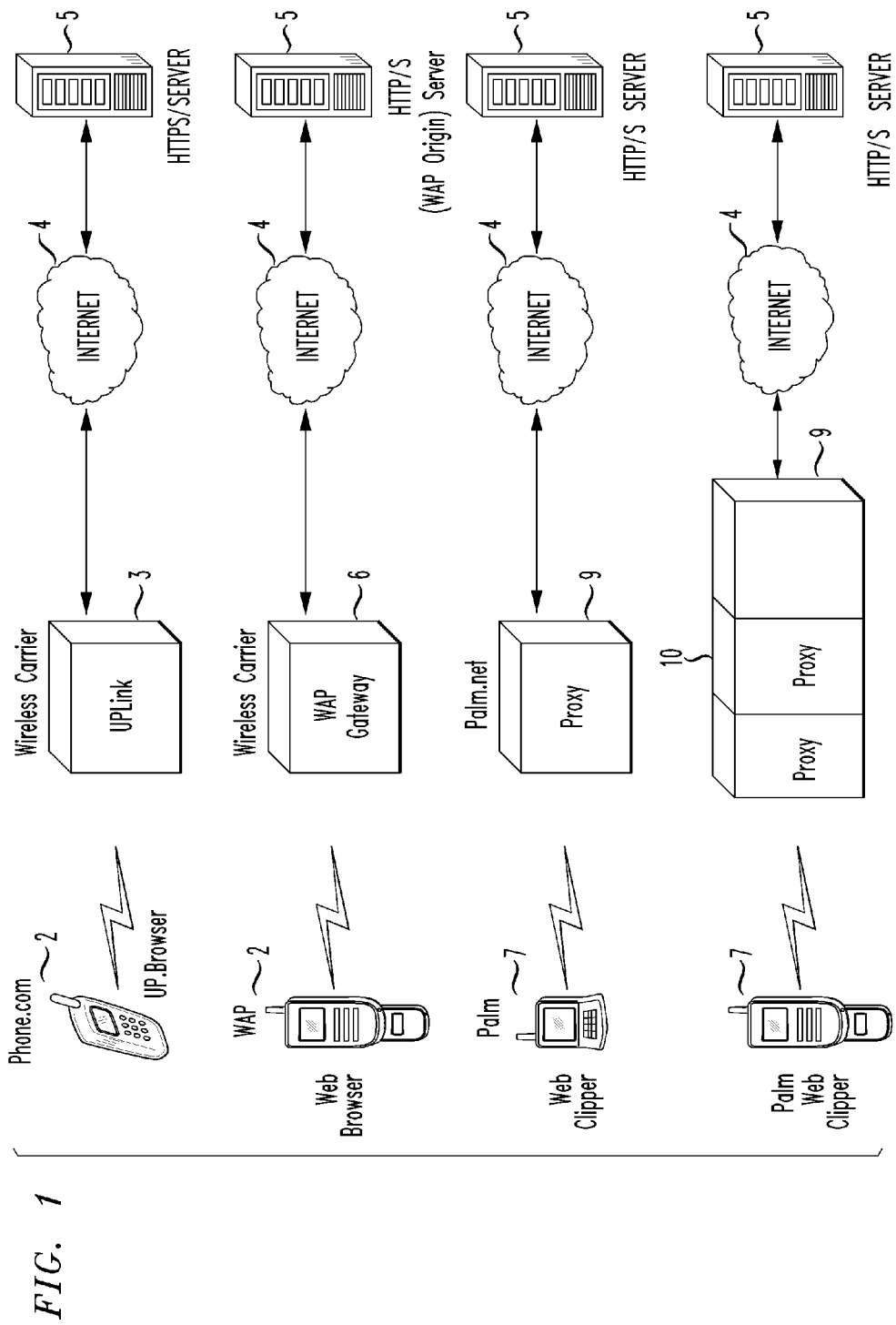
FIG. 1 shows various methods of wireless Internet access.
Figure 2:
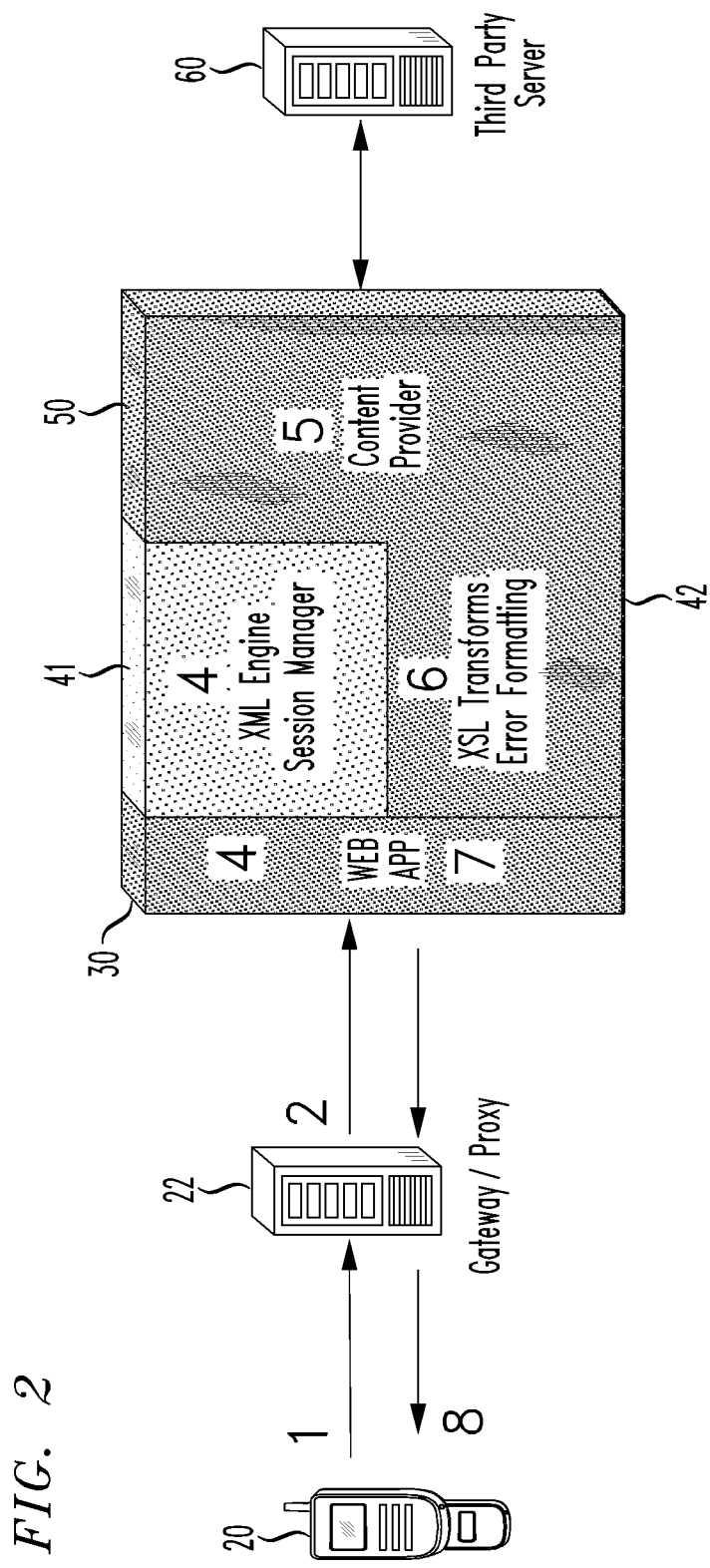
FIG. 2 shows an overview of information flow in the system according to an embodiment of the invention.

FIG. 2 illustrates an exemplary overview of the flow of information when a request for information is made. In step 1, a user makes a request from a wireless device. This is typically done via a Web browser either by entering a URL manually, or by selecting a link on a phone, PDA or other wireless device 20. The user's request passes through the appropriate carrier network 22 in step 2 and eventually arrives, usually as an HTTP/S request, at a web application server 30. The user's request may then be forwarded in step 3 to the system, preferably in the form of Java objects. The translation of the request into Java objects may be accomplished through the use of JSP and/or Java servlets. Once received by the system, the user's request is converted by the translator 41 in step 4 into a standardized format, preferably an Extensible Markup Language (XML™) message, (XML is a technical specification developed by The World Wide Web Consortium (W3C)). The request is also preferably validated and processed and then sent to a content provider interface 50 (CPI). In step 5, the CPI 50 receives the request in the form of a message and produces a response message, preferably in the standardized format. In many cases, the CPI 50 interacts with a third party service 60 to perform any business logic and retrieve the actual content. The response message is returned through the system and converted to the required output content type (i.e., HDML, WML, HTML) by step 6. The transformer may apply a transformation to convert the message. If the standardized format is an XML message, this is preferably done using XSL, a specification also developed by W3C. An appropriate XSL stylesheet is selected for the transformation preferably based on the user agent of the device and other appropriate information. Per step 7, the transformed response content is returned back to the device 20, preferably in an HTTP/S response. The device's microbrowser can then render the content for the user in step 8.

In addition to communication with a CPI to respond to a request, the system and method can unilaterally deploy content from the content provider interface or third party to the device, without having received a request from the device. This is called sending the device an "alert" or "push". The process of sending an alert is very similar to sending a response and is described in more detail below.

A component-based architecture for mid-tier services may be provided to perform the above described functions. As mentioned above, the services provided by the architecture are preferably written in Java and use XML as a common language of transference and translation, although other suitable languages can be used. XML can be used to define a standard set of request and response messages. Employing XML's Document Type Definition (DTD) language, requests and responses used in a standard market setting, such as stock trading and brokerage services, can be defined. Once defined in a given vertical market, a DTD can be used across clients in a uniform fashion. Of course, other schemas can be used to specify vertical market requests and responses.

As mentioned above, the W3C also provides a set of specifications for the Extensible Stylesheet Language (XSL™). Stylesheets can house the presentation format for a given device display, abstracting the presentation and formatting language from the data content housed in the XML. XSL also supplies syntax for transforming XML markup content into other markup forms, and is referred to as SLT. SLT may be used to change the common data formats of content into the presentation languages (i.e., HDML, WML, HTML, etc.) required by the wireless devices.

Figure 3:
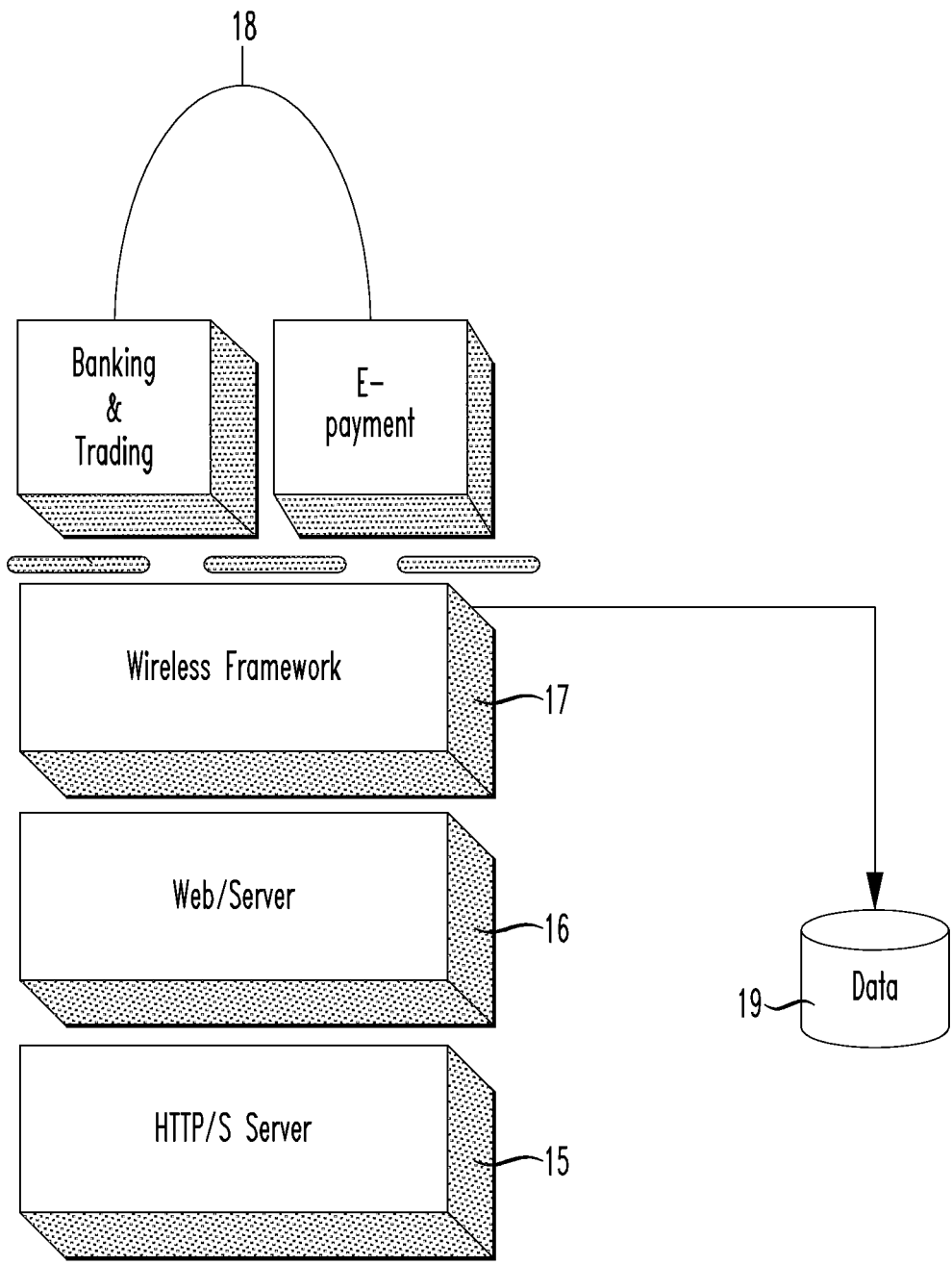
FIG. 3 illustrates components in an embodiment of the system.

Turning now to FIG. 3, an example of a platform deployed with the architecture is illustrated. The platform can include various components such as an HTTP/S server 14, a standard Java application server 16, and a relational database 18. Applications can be developed and supported by this platform. Each component should operate over objects referred to as "messages." Messages can simply be data containers. Each message should have associated header information, such as a message key (described below), which helps to identify the context of the message, its payload, and how it is handled. The payload of the message is the actual data used, in a transaction, such as a quote symbol, an account number, or even a bill summary. Using messages helps to give each component a standard integration interface that facilitates reusability. In a preferred embodiment, messages can be delivered to the components either as Java objects or as XML.

As mentioned above, a message key is preferably associated with each message in order to facilitate the routing of information and the dispatching of requests in the system. The information included in a message key can vary depending on the vertical market. The message key should include the following information:

1. Market Domain—The vertical market (for example, electronic payment and processing, banking, or financial trading) wherein the message falls.
2. Action—Identifies, within the context of the market domain, the specific action to which the message data pertains (for example, quote, account transfer, etc).
3. Action Type—Request, response, alert or other action.
4. Content Provider ID—Uniquely identifies a specific content provider that is to handle the request. In some cases, this is necessary to route the request directly to a given CPI. In other cases, it is not necessary to specify a content provider ID in the message key.

The message key can be used to uniquely identify common requests within a specific vertical market. Information in the message key may be used to facilitate processing of a message by the system. For example, the content provider ID references a specific back-end system with which the user may maintain an account. The system thus knows where to route a request. The content provider ID may remain blank; however, the other elements of the message key; market domain, action, and action type, are preferably always specified in order to ensure the message is properly handled.

Figure 4:
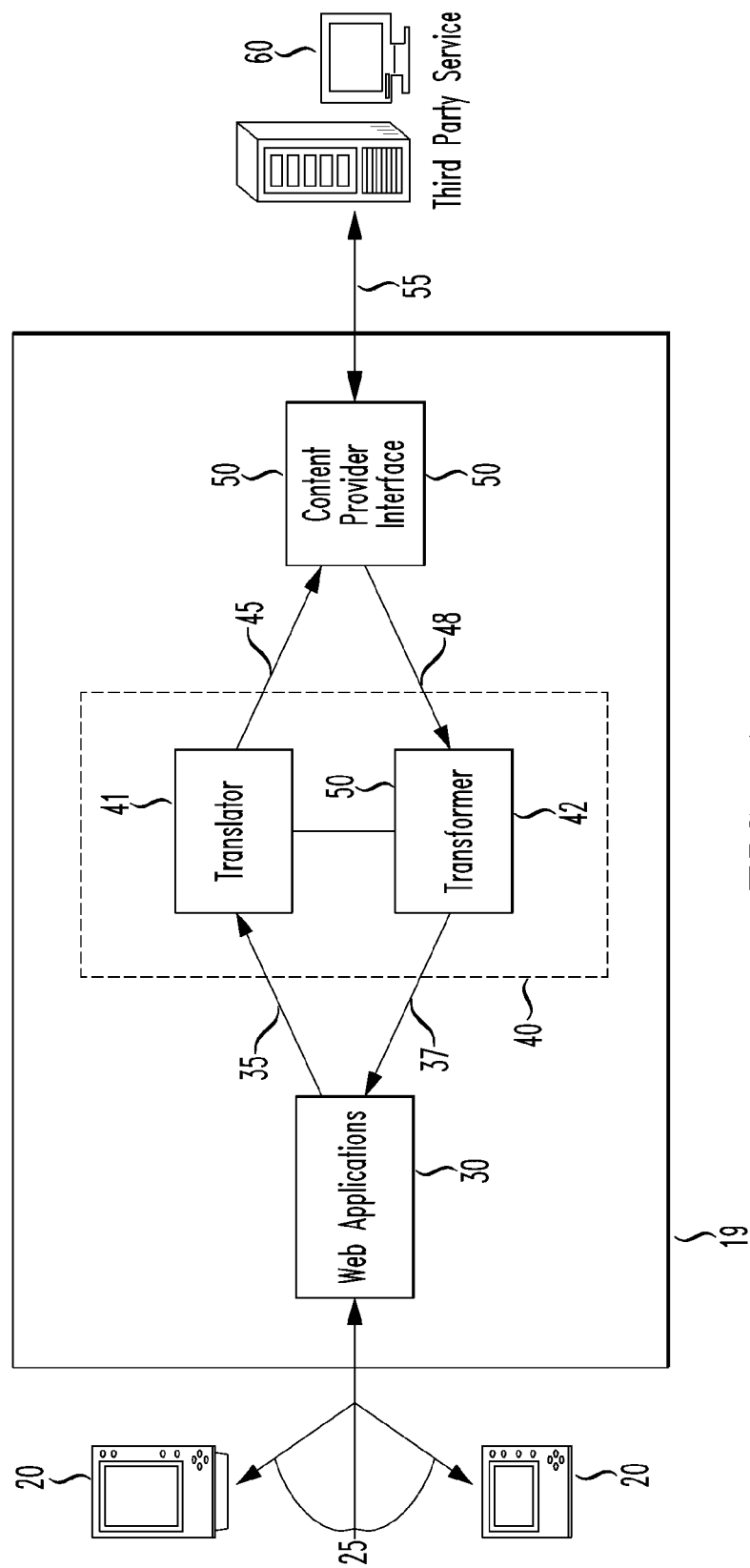
FIG. 4 shows the an overview of the system according to an embodiment of the invention.

FIG. 4 shows an example of a preferred embodiment of system that can provide a uniform approach to content delivery. The components and services described may be hardware, software, firmware, or any other reasonable form or media that accomplishes the tasks at hand as described and disclosed herein. Scalability may be managed by enterprise-level HTTP server tools and technologies (i.e., IBM's HTTP Server and WebSphere).

A plurality of various wireless devices 20 capable of Internet access communicate over a wireless communication medium 25 to a network operation center 19, which houses the components and services that support and process request messages, response messages and alerts for the wireless devices 20. Request messages, response messages and alerts are preferably communicated to and from wireless devices 20 via a proxy server and web applications 30. Proxy server and web applications 30 communicate with the wireless web architecture 40 via communication media 35 for request messages (inbound) and communication media 37 for response messages and alerts (outbound). The wireless web architecture 40 can communicate with a plurality of content provider interfaces 50 via communication media 45 for translated request messages and via communication media 48 for response messages and alerts. Content provider interfaces 50 may communicate with third party content providers 60 via communication media 55, such as a wide area network (WAN) or the Internet. The third party content provider can provide information to generate a response message or an alert. A content provider interface 50 may be an object that is registered with the system to handle specific actions that are sent in a request message. The content provider interface 50 may provide proxy services to the third party content providers or it may fully encompass the content provider capabilities.

In a preferred embodiment, wireless web architecture 40 translates and transfers request messages via translator 41. The translator 41 translates the request message into the standardized format, preferably an XML request, and forwards the translated request message to a selected content provider interface 50. Once a response message or an alert is generated by a content provider interface 50 or received from a third party content provider 60, the response message or alert is transformed by transformer 42 via selected transforms, i.e. XSL transforms, into device type specific, content type specific or other specific forms for the wireless devices 20. The message is then forwarded to proxy server and web applications 30 for communication to wireless devices 20.

A method for spontaneously sending data to a device is also provided. As mentioned above, this is called sending an alert. In one embodiment, data and an identifier (ID) are sent to transformer 42. The data may come from either CPI 50 or a third party content provider 60. The ID may be one of a user ID, a device ID, a client ID, a customer ID or some other type of identifier. The ID is referenced in a database to associate it with a device. A format for presentation to the device is preferably determined and a style sheet is selected based on the device. The selected style sheet is then used to transform the data. After transformation, the transformed data is forwarded to the appropriate device 20.

Figure 5:
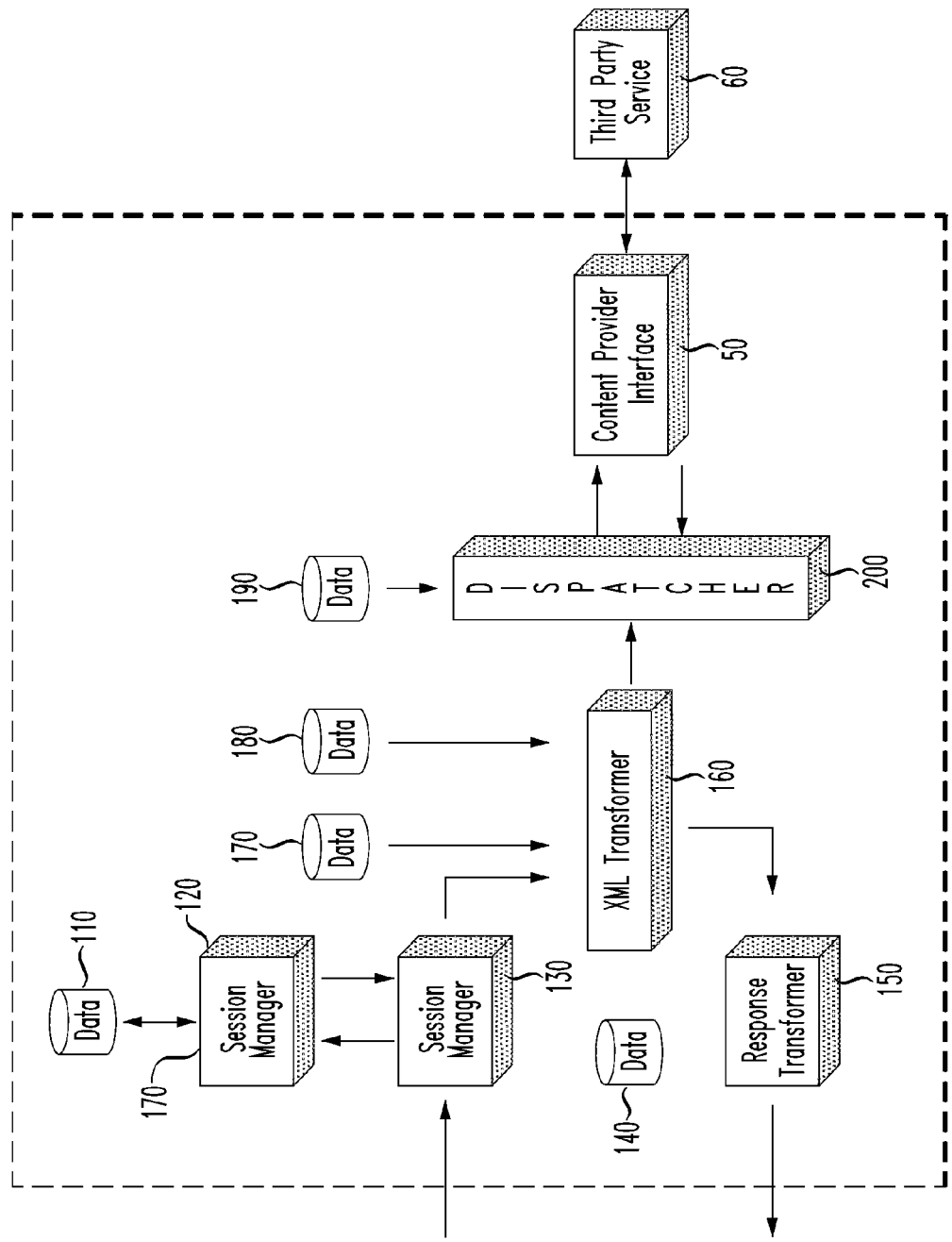
FIG. 5 depicts a logical component model for handling asynchronous request messages/responses and alerts.

FIG. 5 depicts an example of a logical component model for handling asynchronous request messages/responses and alerts. Request messages can be passed to the architecture through a synchronous or asynchronous mechanism, originating in different forms (e.g., XML, Java objects, HTTP, etc.). The architecture can provide support for converting request messages into XML messages that are dispatched to specific third party content providers for processing. XML responses are then converted back into an appropriate content type (XML, HDML, WML, HTML, etc.) and returned in the response. Again, XML is preferably the intermediate language of data exchange.

Figure 6:
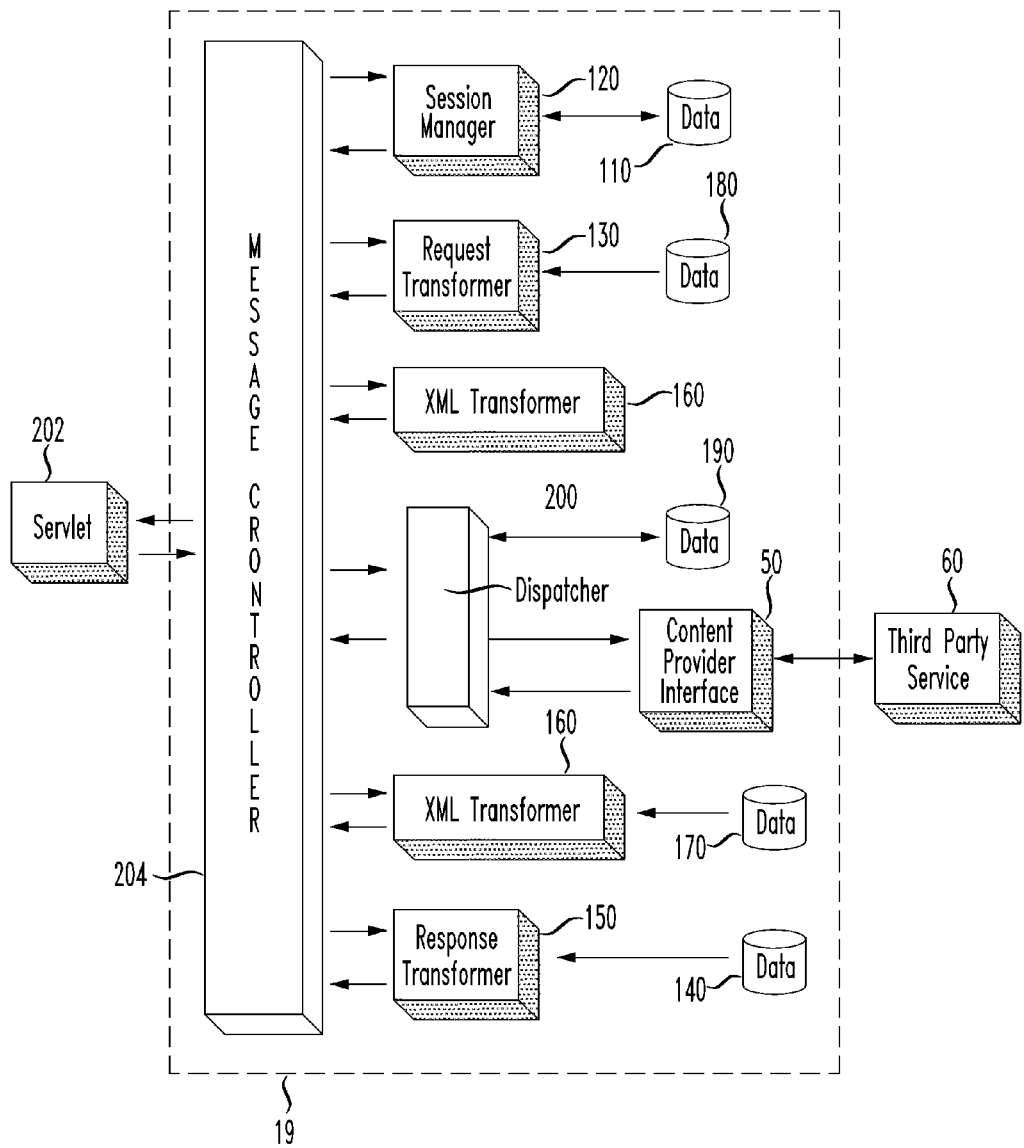
FIG. 6 depicts a physical model of a wireless web architecture according to an embodiment of the invention.

In connection with FIG. 5, FIG. 6 illustrates a specific component model that may be used for handling synchronous requests. The individual components shown in FIGS. 5 and 6 are discussed in more detail below. Although described below in a specific embodiment in connection with XML, the invention may be implemented with various other languages.

In general, request messages, which may be generated by wireless devices, are communicated to a request transformer 130. The request will usually be in the form of an HTTP request. However, other types of messages can be used. The request transformer may communicate MIME information to a session manager 120, which in turn queries database 110 and receives session information. Request transformer 130 then processes the request messages and the session information to yield a flattened, basic XML stream, which is communicated to XML transformer 160. Here, "flat" is used in the sense that each form variable's corresponding XML tag is an immediate descendant of the document root. XML transformer 160 further processes the flattened, basic XML stream into an XML request message, which is communicated to dispatcher 200. Dispatcher 200 selects a content provider interface 50 from a plurality of content provider interfaces. This is preferably done based on information retrieved from content provider map database 190 and information in the request message. Dispatcher 200 then forwards the XML request message to the selected content provider interface 50, which may further communicate with third party service 60 to generate a response message.

Upon receipt of an XML response message or alert from the third party content provider 60, content provider interface 50 forwards the response message or alert to dispatcher 200. Dispatcher 200 forwards the XML response message to XML transformer 160. XML transformer 160 can transform the response message into a format for the device 20. XML transformer 160 queries XSL database 170 and DTD database 180. Based on the information retrieved, XML transformer 160 selects XSL transforms to be applied to the XML response message or alert in order to transform the XML response message or alert into the appropriate format. The processed XML response or alert is then forward to the response transformer 150. Response transformer 150 can query a Java bindings database 140, if necessary, and convert the processed XML response into the form expected by the wireless device, if conversion is necessary.

In a preferred embodiment, inbound HTTP requests are received by a servlet 202, or some similar server-side construct, and then forwarded to the wireless web architecture for processing. An interface component, called the message controller 204, that can provide a simple application programming interface (API) for the application developer is also preferably provided. The message controller 204 can manage the synchronous block-and-wait nature of HTTP requests. Synchronous as used herein does not mean that messages transfers are clocked, but rather that there is a mechanism via the message controller that blocks any additional request messages for service while waiting for a response. Thus, the servlet 202 can forward HTTP request information to the message controller 204 and wait for a device-specific response to be formulated, which it then returns as the HTTP response. Also, the database objects that are shown and described do not necessarily imply that there will be more than one database.

The different components shown in FIGS. 5 and 6 and their interaction will now be described in more detail.

Message Controller

Figure 7:
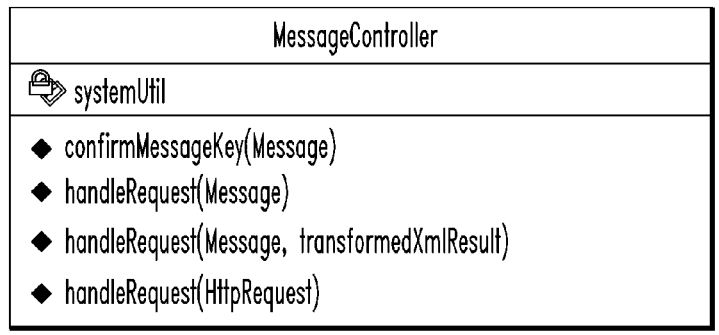
FIG. 7 illustrates method interfaces to the message controller.

The message controller 204 is preferably a wrapper around the internal components of the architecture for use in an HTTP context. The application developer will, in most cases, interface with this component, and will not necessarily have to interface directly with the other internal components of the framework. FIG. 7 illustrates an example of a message interface.

Figure 8:
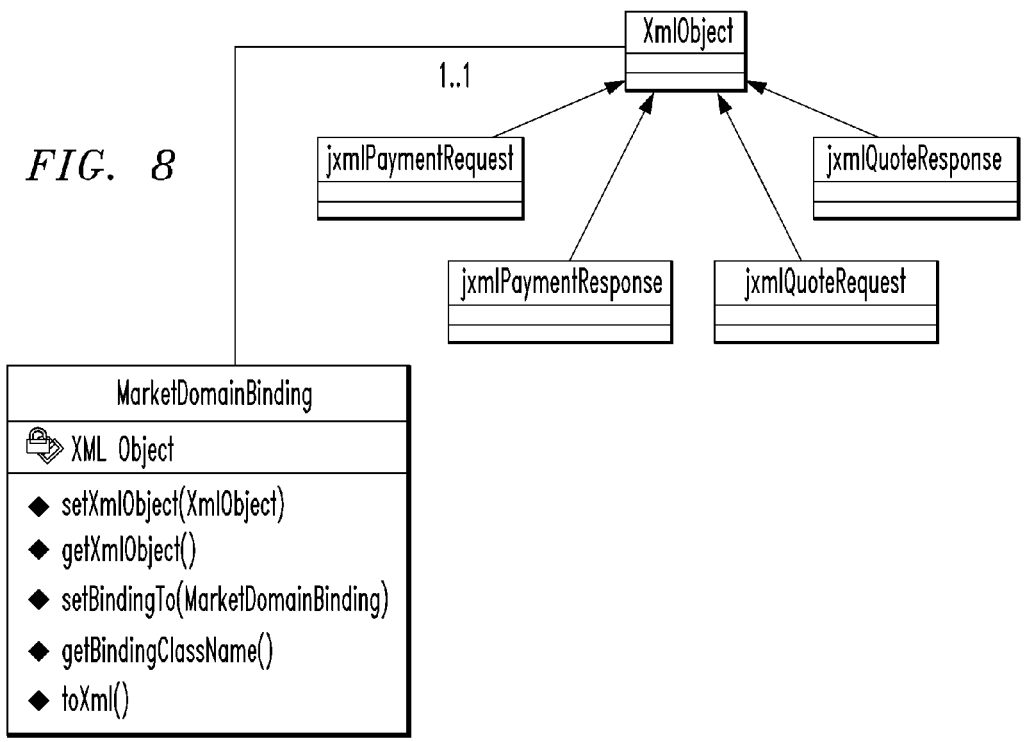
FIG. 8 is a Java binding diagram.

In one embodiment, HTTP requests from wireless devices are translated into messages in a standardized format. This can be accomplished with the message controller. Various interfaces may be provided on the message controller to give greater control regarding this translation to the application developer. For example, Java Binding interfaces can be offered through the message controller 204. Java bindings, or classes representing a given XML entity, may be provided for each XML request message and response message that is part of the DTD for the given market domain. Bindings enable the application developer to employ a Java interface instead of working with the XML directly. Each class may implement accessor methods for the DTD elements that are associated with that object. For portability and interface abstraction, these bindings are preferably then wrapped inside a class (named MarketDomainBinding in FIG. 8). Every binding should implement a toXml( ) method that streams out its contents as an XML stream. FIG. 8 diagrams an example of this interface.

A second method for creating messages from HTTP requests involves automated conversion techniques. In order to use this method, the application developer should appropriately name their HTTP form variables (querystring keys) according to the equivalent XPath specification of the DTD, and include hidden fields for the message key. The request transformer 130 should parse each of the form variables out of the querystring, along with its associated values, and place it into "flattened XML," eventually becoming a message.

For example, in most cases the HTTP request will include a message key. As discussed above, the message key should include an action, i.e. a request for a stock quote. The form variable "action" is parsed out of the message. Based on the specified action, additional information may be required to form the message. In this example, a stock symbol is required for the stock quote request. The HTTP request can be parsed to find the addition information. This information and the form variables are then placed in the message.

A third approach for creating messages from HTTP requests allows the application developer to provide XSL to transform a "flattened XML" request message. In this scenario, the application developer registers their XSL in the XSL database 170, to be used by the XML transformer 160. Once the HTTP request is received and "flattened" by the request transformer 130, for example, by the second approach described above, the XML transformer 160 may be invoked to transform the resulting XML into an appropriate form for the data. This approach offers greater flexibility than the automatic conversion.

Request Transformer

Figure 9:
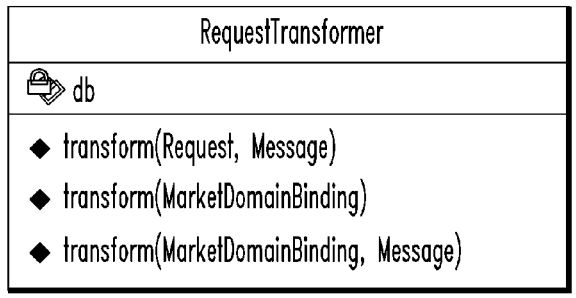
FIG. 9 illustrates a request transformer interface.

The request transformer 130 can receive an incoming request object that should correspond to the initial HTTP request, and perhaps a Java or XML binding of the request. From these it can generate an XML stream. If a Java binding is received, the body of the stream is just the XML derivable from the binding. In the case where no binding is received, the stream includes a body, which is a "flattened" encoding of the HTTP request's form data. A standard procedure that may be used for writing form values to a simple "flat" XML document is for each tag to have the same name as a form variable and the tag's value is the value of the variable. In addition to form data, session data, MIME data, and message key information may be encoded in the stream. FIG. 9 illustrates an example of the request transformer interface. The resulting XML stream does not necessarily conform to a DTD accepted by a content provider's interface. In those cases, the XML transformer 160 (see below) may receive the stream and can transform it into an acceptable XML message request.

Session Manager

The session manager 120 should be responsible for identifying and returning state information about a given set of interactions between a client device (and its user) and the Web application server 30. The session manager can operate as an extractor to access system information about a browser of a particular device. In this context, "session" does not refer to the establishment of a secure connection (for example, SSL), but rather to a series of interactions between a client and server over a defined period. The following kinds of state-based information may be maintained for the duration of a session:

1. System state, or the information that must be maintained for the internal functions of the system, for example, the user agent (or browser), or the type of device originating the request.
2. User-defined state, or the information that must be maintained for the front-end application programmer to successfully supply a smooth user interface (for example, hypertext history information, or a notion of the user's previous path, and the user's unique ID).
3. Content provider state, or the information that must be maintained for the back-end information source, i.e. the content provider (for example, a session token that the content provider needs to perform transactions on behalf of the user).

When a request is made, the session manager 120 should first determine whether an ongoing session exists for the requesting client. If no session exists, the session manager 120 can create a new object to maintain the three kinds of state-based information mentioned above. Otherwise, if a session already exists, then the state information can be returned from a database 110.

Certain variables of the system state can be configured with each application. As each new session is constructed, the session manager 120 automatically populates the system state with certain variables found in the HTTP header of the request. A system administrator should configure the application with the necessary information to extract the appropriate variables. The device type, user agent, and subscriber number are among typical variables that can be automatically extracted.

XML Transformer

Figure 10:
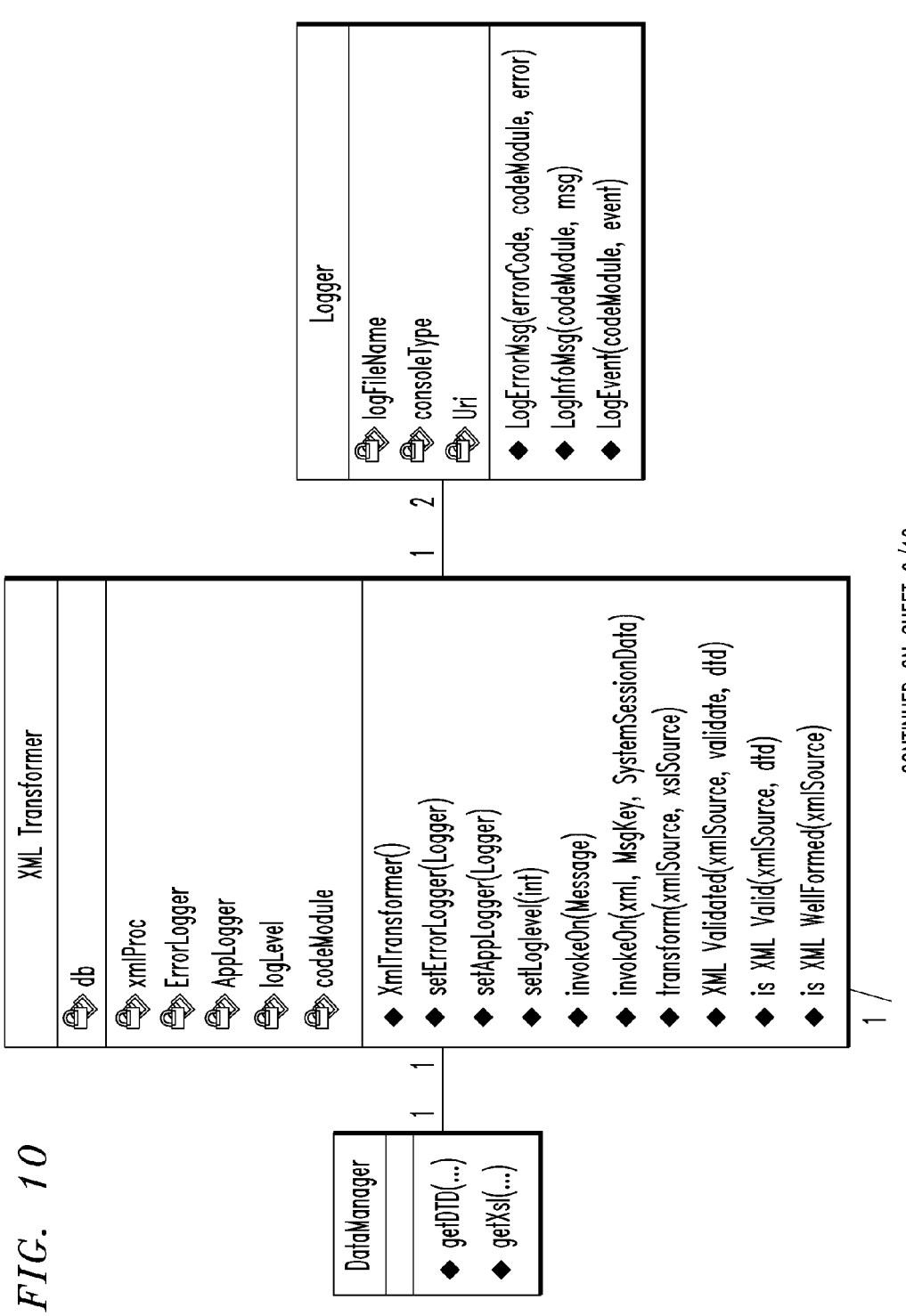
FIG. 10 is an object model of the XML transformer.
Figure 10:
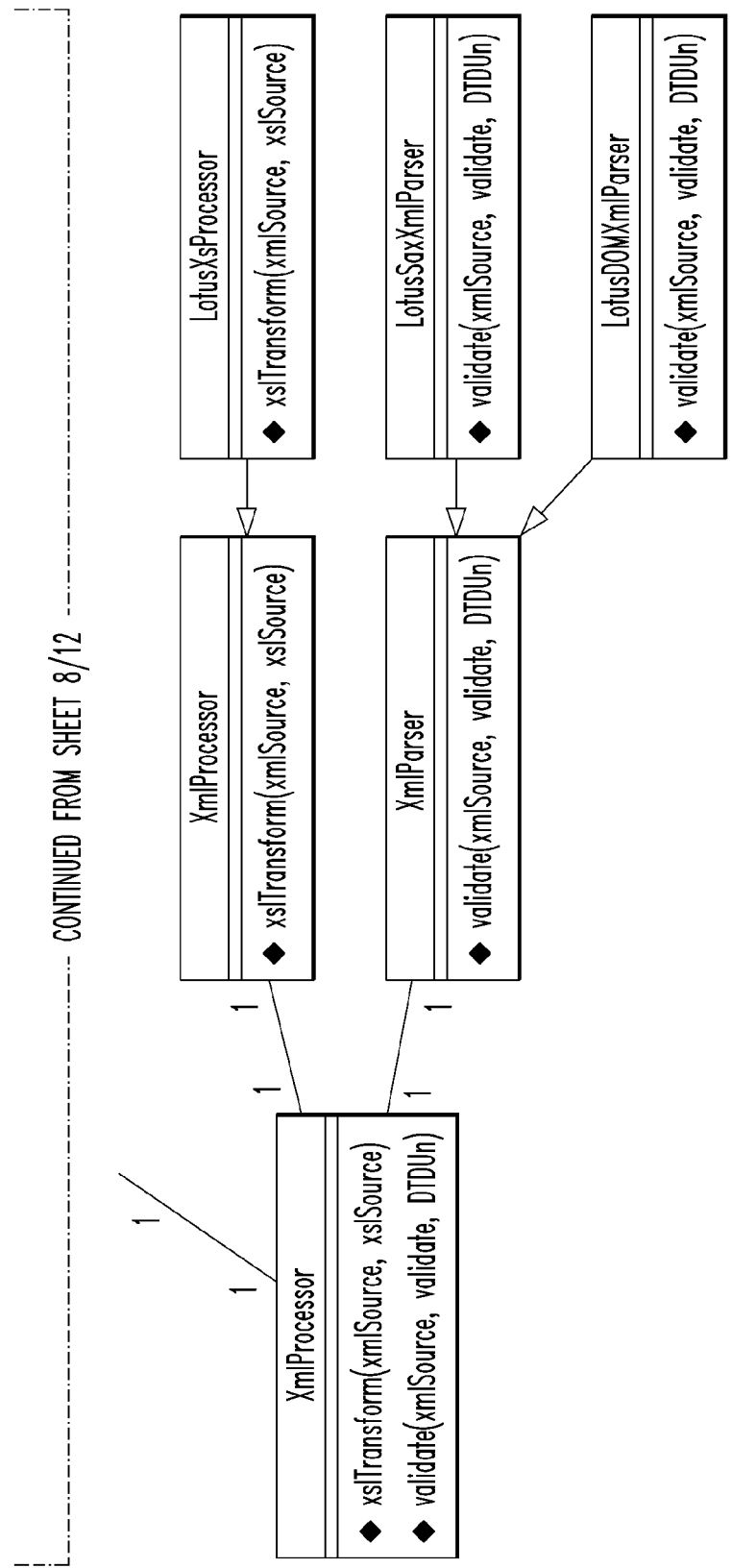

The XML transformer 160 can transform XML input into another form of XML output via XSL transformations. However, it is also possible to use the XML transformer to produce non-XML output, such as HDML or even plain-text. The XML transformer 160 can receive inbound XML from the request transformer 130, transform it and pass the resulting request message to the dispatcher 200. The XML transformer 160 can also receive outbound response messages from the dispatcher 200, transform them into the correct format (e.g., HTML, HDML, WML) for the target device/user, and forward the result to the response transformer 150. Thus, XML transformer 160 is shown twice in FIG. 6. FIG. 10 is an example of an object model of the XML transformer 160 and its associated objects.

In the example shown in FIG. 10, The transformation is facilitated by an XMLProcessor, which may include an XmlParser and XslProcessor. The parser creates a Document Object Model (DOM), and supports a run time setting that can be used to validate XML against a DTD. The XSL processing component handles the actual transformation.

The XML transformer 160 can receive a message, and find and apply the appropriate XSL for transforming the data contained within that message. The XSL source (for example, string, URI or file) is preferably retrieved through a database query to database 170, preferably taking into account the following items from the message and from session information:

Message Key i.e. {market domain, action, action type, content provider ID}
User Agent (or browser type) of the device making the request
Type (or model) of device making the request
User ID These items affect how information should be displayed on a given device, and should be taken into account by the application developer when creating the application. A map cross referencing information in the message and style sheets should be created. The map can indicate which style sheets are to be used for certain types of messages.

The following table helps to illustrate this point. The following table is an example of the information that may be stored in database 170.

| XSL Selection Map | | | | | | |
|---|---|---|---|---|---|---|
| Market Domain | Action | Action Type | Content Provider | Device Type | User Agent | XSL_URI |
| Financial | RealTimeQuote | Response | XYZ Brokerage | 3-line phone | UP.Browser/ 3.1-UPG1 UP.Link/3.2 | http://.../xsl_stylesheets/rt QuoteResp.xsl |
| Financial | Delayed Quote | Response | XYZ Brokerage | 3-line phone | UP.Browser/ 3.1-UPG1 UP.Link/3.2 | http://.../xsl_stylesheets/d QuoteResp.xsl |
| Financial | RealTimeQuote | Response | ABC Inc | Palm | Mozilla/2.0 | http://.../xsl_stylesheets/rt QuoteResp1.xsl |

Consider a response message with the following message key: {Financial, RealTimeQuote, Response, ABC Inc}, a device type of "Palm" which has a "Mozilla/2.0" User Agent. A database query will be transacted to look for XSL in database 170 that matches the above information. The third row in the table matches the above description with the location, for example, an URL, for the appropriate XSL style sheet, namely "http://.../xsl_stylesheets/rtQuoteResp1.xsl."

Figure 11:
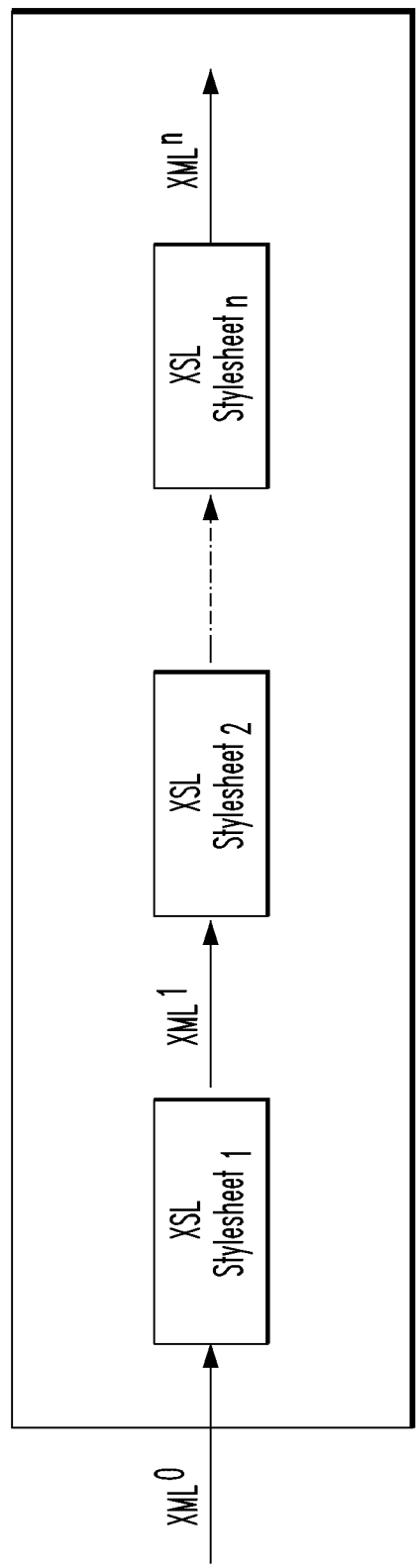
FIG. 11 illustrates chaining transformations.

In many cases, the XSL lookup and selection process will produce a single XSL style sheet. However, there may be situations where it is desirable that the lookup produce a collection of more than one XSL style sheet. When this occurs, there are a number of possible strategies for applying the multiple transformations to an XML source, including:

Sequential application, in which multiple sheets are applied in turn to an initial XML source (in a chained fashion), producing a single XML output Independent application, in which multiple style sheets are applied independently to the same initial XML source, resulting in multiple XML outputs In the sequential strategy, multiple XSL style sheets are selected. Depending upon which style sheets are selected, the style sheets may be applied in a pre-selected order or the ordering may not be relevant. For example, the result of a first style sheet may be need for the application of a subsequent style sheet. After determining an order, each subsequent XSL style sheet is applied, in turn, to the result of the previous transformation. Thus, it is preferable that the result of each interim transformation be well-formed XML, so that it can serve as input to the next transformation. FIG. 11 depicts the sequential application of S.S. The figure shows $XML^0$, the initial XML source, being transformed into $XML^n$ via n distinct transformations. The $i^{th}$ transformation is specified by XSL Stylesheet$_i$, and the result of applying the $i^{th}$ transformation is the XML output, $XML^i$.

Figure 12:
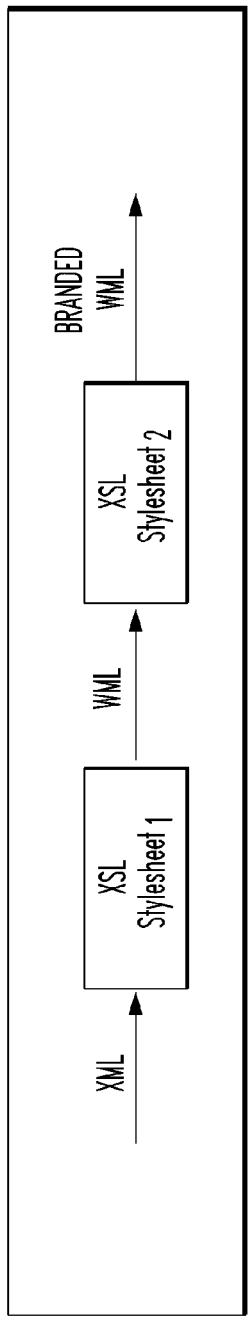
FIG. 12 illustrates chaining transformations for branding.

One example of the utility of chaining sequential transformations involves content branding. "Raw" XML can be transformed into a presentation format appropriate for an application or device, for example, a specific browser, and then, as a second step, references to appropriate branding material, for example, logos, can be inserted. This facilitates separating branding from other presentation or stylistic concerns. In most cases, the branding step can just as easily be performed first, and the presentation format transformation applied second. FIG. 12 illustrates this as XML is transformed into WML, by XSL stylesheet$_1$ in preparation for presentation on a WAP phone, for example, and then that WML is branded for a specific enterprise by XSL stylesheet$_2$.

Figure 13:
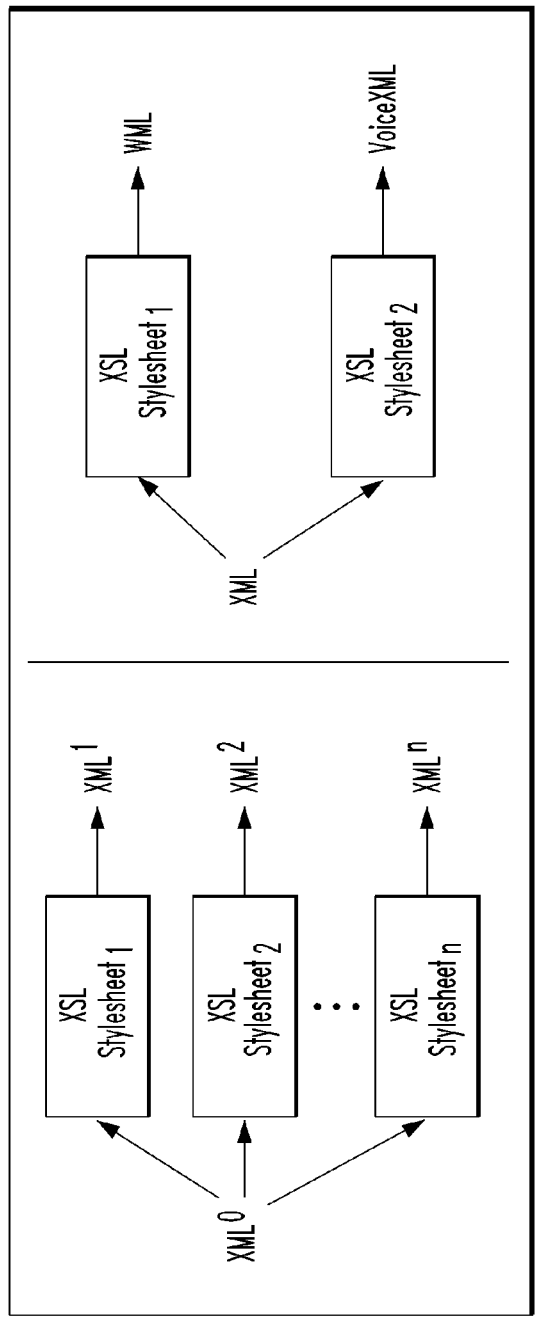
FIGS. 13a and 13b show simultaneous transformations.

A second multi-transformation strategy is depicted in FIGS. 13a and 13b. Multiple XSL stylesheets, XSL Stylesheets$_1$-XSL Stylesheets$_n$ are applied to source XML$^0$.

The application of each stylesheet results in separate XML output, XML$^1$-XML$^n$. Here there is no ordering or sequencing of the selected XSL style sheets. Each transformation is independent and can be applied simultaneously to a single XML source. An example of this strategy is the delivery of content, simultaneously as voice and text, to a single device. FIG. 13b shows an example of this strategy using transformations by stylesheet$_1$ and stylesheet$_2$ into VoiceXML and WML for voice and text presentation, respectively. The source XML is transferred by, XSL Stylesheets$_1$-XSL Stylesheets$_2$ into different output types.

Figure 14:
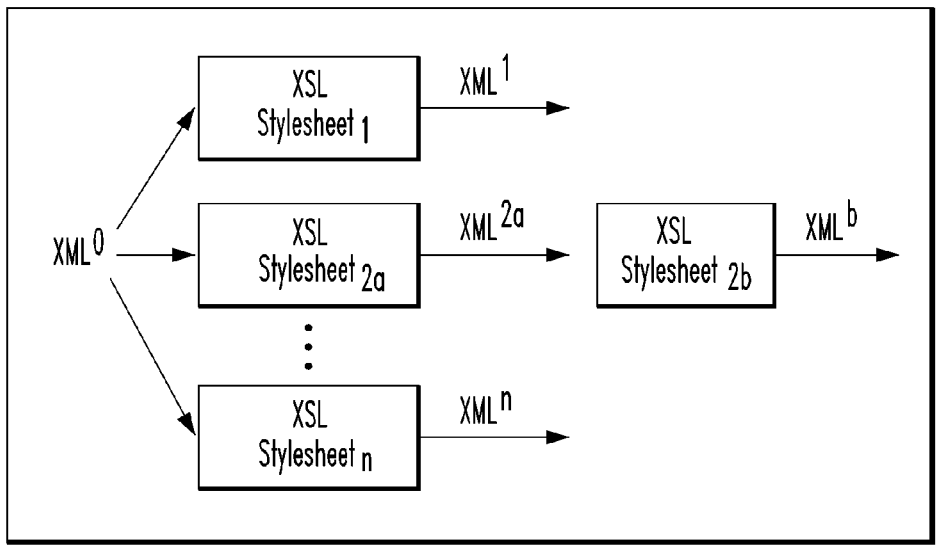
FIG. 14 illustrates a hybrid simultaneous and sequential transformation.

Sequential and independent multi-transformation strategies are not the only possibilities, nor are they mutually exclusive. They can be combined in a number of ways, producing a variety of hybrid strategies. One example of a hybrid strategy is shown in FIG. 14, in which one of n simultaneous transformations is comprised, of a sequence of sub-transformations. Here, XSL Stylesheets$_1$-XSL Stylesheets$_n$ are applied simultaneously to source XML$^0$, resulting in output XML$^1$-XML$^n$. Application of each of these style sheets should result in well-formed XML. Consequently, subsequent stylesheets may be applied to output XML$^1$-XML$^n$. In the example shown, stylesheet$_{2b}$ is sequentially applied to output XML$^{2a}$, resulting in output XML$^{2b}$.

Response Transformer

Figure 15:
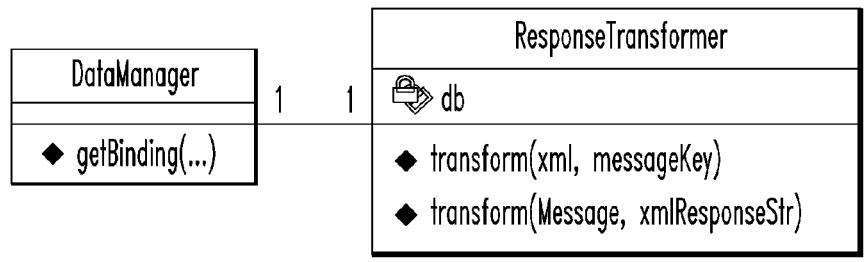
FIG. 15 shows a response transformer.

The response transformer 150 receives outbound XML messages, for example, from the message controller 204, and, if necessary, converts them into another form that is expected by the application servlet 202 or wireless device 20. If the servlet 202 expects an XML stream, no conversion will occur. If the servlet expects a Java binding, the specific class for the binding will be retrieved from the database 140. The binding should be instantiated, populated with the data from the XML string and sent back through the message controller 204 to the servlet 202. FIG. 15 illustrates an example of the response transformer/data manager interface.

In one embodiment, the response transformer may also generate a combined response from a plurality of responses or alerts from one or more content providers. The plurality of responses may be generated from a plurality of requests.

Dispatcher

The dispatcher's 200 primary function is to dispatch incoming messages to an appropriate CPI 50, which, in turn, may communicate with a third party content provider 60. To do so the dispatcher 200 must first identify which CPI 50 can and should handle the request embedded within the incoming message, and, if necessary, load that CPI 50. This may be accomplished using a database lookup on information in the message key (for example, {market domain, action, action type, content provider id}). In a preferred embodiment only certain information, for example, market domain, need be specified for a database lookup to be attempted. Any or all of the other components of the message key can be "wildcarded" for the lookup. A wildcard stands for any values that might occur in the database for that component of the message key. The following table helps illustrate this point.

| Content Provider Interface Map | | | | |
|---|---|---|---|---|
| MarketDomain | Action | ActionType | ContentProvider | ContentProviderInterface |
| Financial | RealTimeQuote | Request | XYZ Brokerage | mojo.cpi.XyzBrokerageCPI |
| Financial | DelayedQuote | Request | XYZ Brokerage | mojo.cpi.XyzBrokerageCPI |
| Financial | DelayedQuote | Request | JKL Financial | mojo.cpi.JklFinancialCPI |
| Financial | RealTimeQuote | Request | ABC Inc | mojo.cpi.AbcIncCPI |

Consider a request with an associated message key having the following values:

(Financial, RealTimeQuote, *,*)

This message key contains values for market domain and action, "Financial" and "RealTimeQuote," respectively, and wildcards in place of action type and content provider values. The CPI 50 found in each row of the table where the value of market domain is "Financial" and the value of action is "Real-TimeQuote," namely mojo.cpi.XyzBrokerageCPI and the mojo.cpi.AbcIncCPI, can service this request. In cases where more than one CPI can service a request, a round-robin is preferably used to determine which CPI to send the request. In comparison, more detailed a request with the message key (Financial, RealTimeQuote, *, XYZ Brokerage) can only be serviced by mojo.cpi.XyzBrokerageCPI.

Content Provider Interfaces

Figure 16:
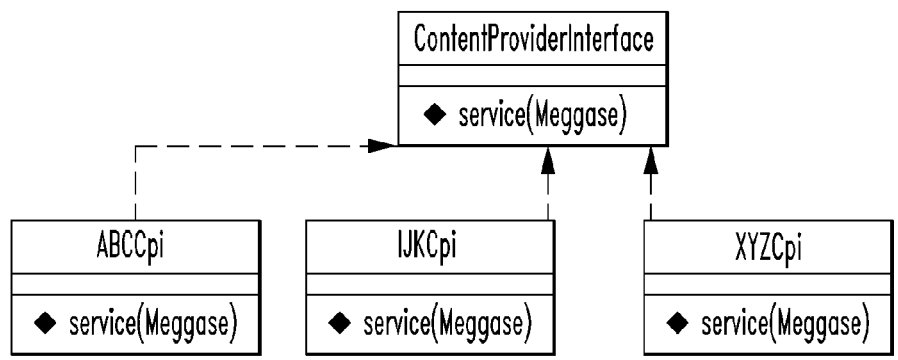
FIG. 16 shows a CPI interface.

CPI 50 may be java classes that implement an abstract interface for processing messages that are forwarded from the dispatcher 200. FIG. 16 illustrates an example of the CPI interface. The back-end application developer should provide CPI classes specific to that application. The CPI 50 may process the inbound message, and its contained XML request in any manner it sees fit, either through direct manipulation of an XML DOM tree, SAX, or through a java specific XML binding. If a developer chooses to use a bound Java class, an alternative to passing the CPI a direct XML stream is to pass and receive a bound Java instance. This shields the application developer from having to know anything about XML itself, and allows him to simply concern himself with the actual data model or message content. Inbound content provider session data may be made available to the CPI 50 through the incoming message. For outbound data, the CPI is preferably able to change the content provider session data if required, and insert the response XML into the market data portion of the outgoing message.

The above components can be combined into a system to provide a uniform approach to content delivery. Using this system, an application developer is able to render their content in the appropriate format to a wide variety of devices, without having to customize the application for each type of device.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

We claim:

1. A method for applying multiple transformations to data, comprising:
   receiving via a content provider interface, content provider data;
   selecting a plurality of transformation specifications based on information about said content provider data;
   applying the transformation specifications to the content provider data into a format for a physical receiving device based on a hypertext history; and
   transmitting said transformed content provider data to said physical receiving device.

2. The method of claim 1, wherein a result of an interim transformation is well-formed Extensible Markup Language (XML).

3. The method of claim 1, wherein an order of applying the transformation specifications is pre-selected.

4. The method of claim 1, wherein the transformed content provider data is an XML message.

5. The method of claim 1, wherein the transformation specification is an Extensible Stylesheet Language (XSL) style sheet.

6. A method for applying multiple transformations to data, comprising:
   receiving, via a content provider interface, content provider data;
   selecting a plurality of transformation specifications based on information about said content provider data;
   applying the transformation specifications to the content provider data into a format for a physical receiving device based on a content provider state maintained for a back-end information source; and
   transmitting said transformed content provider data to said physical receiving device.

7. The method of claim 6, wherein a result of an interim transformation is well-formed Extensible Markup Language (XML).

8. The method of claim 6, wherein an order of applying the transformation specifications is pre-selected.

9. The method of claim 6, wherein the transformed content provider data is an XML message.

10. The method of claim 6, wherein the transformation specification is an Extensible Stylesheet Language (XSL) style sheet.

* * * * *